2,903,345
ETCHING OF BARIUM GLASS

Norman Hedley and Howard Tabachnick, Stamford, Conn., assignors to American Cyanamid Company, New York, N.Y., a corporation of Maine No Drawing. Application November 15, 1957
Serial No. 696,632

7 Claims. (Cl. 41—42)

This invention relates to an improvement in the etching of glass with hydrofluoric acid in which the glass contains barium. More particularly, in etching barium glasses with hydrofluoric acid there is a tendency for the formation of barium silicofluoride, $BaSiF_6$. Barium silicofluoride in the aqueous etching medium tends to precipitate as a slimy deposit on the glass which is difficult or impossible to wash off. The precipitation of this slimy deposit is inhibited by a synthetic, polymeric, water-soluble, polyelectrolyte.

In processing certain glasses it is customary to etch them with hydrofluoric acid, particularly in the manufacture of television tubes. A dilute hydrofluoric acid of from 6 to 10% is frequently used to etch and roughen the surface of the glass on which fluorescent materials are to be deposited to give a tooth so that fluorescent materials will adhere more readily and more uniformly.

With the use of higher voltage circuits and, particularly with the use of the high voltage tubes which are required in colored television and which may require operation at voltages in excess of 30,000, there is the danger that X-rays or other deleterious radiation will be formed within the envelope of the cathode ray tube and that this radiation will penetrate the envelope of the tube, particularly the face, and be deleterious to watchers of the set.

Certain glasses containing heavy metals limit the transmission of this harmful radiation. Particularly barium containing glasses have been found to markedly decrease the emission of X-rays and other shortwave radiation which may be harmful and yet pass visible light. It, therefore, appears desirable that the face of the picture tube be of barium glass. In the past it has been difficult to use barium glass for this purpose because, although it satisfies other criteria, there is difficulty in the etching of this glass because barium silicofluoride formed by the interaction of the barium in the glass and the hydrofluoric acid precipitates as a slimy deposit which is difficult to wash off, and, as a result, the phosphors do not adhere properly to the face of the cathode ray tube.

Unexpectedly, synthetic polymeric water-soluble polyelectrolytes, if present within the range of about 50 to 500 parts per million by weight of the aqueous solution of hydrofluoric acid, prevent to a large extent the precipitation of barium silicofluoride with its accompanying problems. Unexpectedly, these polyelectrolytes have little effect on the precipitation of other silicofluorides such as calcium silicofluoride, magnesium silicofluoride, aluminum silicofluoride, beryllium silicofluoride, boron silicofluoride, and lead silicofluoride and strontium silicofluoride. The effect of the barium silicofluoride in causing deposits varies with the proportion of barium in the glass. Glasses containing larger amounts of barium give more difficulty in etching but are more effective in preventing the transmission of deleterious shortwave radiation. Accordingly, it is desirable in the face of the tube to use glasses having a comparatively high percentage of barium. Certain barium crown glasses have as much as 42% of barium oxide as a constituent. For special purposes larger amounts of barium may be incorporated in the glass. Smaller amounts of barium as the oxide in the glass are proportionately less effective in absorbing deleterious radiation. Some of these barium containing glasses also contain lead.

The rate of etching is a function of the temperature and strength of the hydrofluoric acid. Room temperature or warmer conditions may be used. The strength of the acid may vary from about 4 to 20%, and preferably is between about 6 and 10%. Too dilute an acid etches too slowly, tends to give a smoother surface than is desired.

The precipitation of barium silicofluoride in the etching solution is inhibited by a small amount of a synthetic polymeric water-soluble polyelectrolyte having a structure derived by the substantially linear polymerization of at least one monoolefinic compound through the aliphatic unsaturated group.

Particularly suitable polyelectrolytic polymers for use in the present invention are the polymers of acrylic or methacrylic acid derivatives, for example acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted aminoalkyl esters of either acrylic or methacrylic acids. These polymeric compositions may be homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example carboxyl groups. Generally, more types of polyelectrolytic polymers can be prepared by subsequent reactions of polymers and copolymers. For example, polymers containing nitrile groups may be hydrolyzed to form water-soluble amide and carboxy containing polymers or hydrogenated to form amine containing polymers. Similarly copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone containing polymers, for example polyvinyl methyl ketone. Similarly active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphoric acid or derivatives thereof, heterocyclic nitrogen groups, amino-alkyl groups, alkoxy radicals and other organic groups, the number of which groups and the relative proportions of hydrophilic and hydrophobic groups being such as to provide a water-soluble polymeric compound having a substantially large number of ionizable radicals.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetatemaleic anhydride, hydrolyzed styrenemaleic anhydride copolymer, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetate-maleic anhydride copolymer, vinyl formate-maleic anhydride copolymer, vinyl methyl ether-maleic anhydride copolymer, isobutylene-maleic anhydride copolymer, styrene-maleic anhydride copolymer, ethyl acrylate-maleic anhydride copolymer, vinyl chloride-maleic anhydride copolymer, hydrolyzed acrylonitrilevinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cation-active groups are also useful. Suitable compounds are, for example, ethyl acrylate and acrylamidopropylbenzyldimethylammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quaternized with benzylchloride, allyl chloride, etc., and quaternized copolymers of vinyl alcohol and morpholinylethylvinylether and the like.

Among the especially preferred polymeric compounds are the sodium salts of hydrolyzed polyacrylonitrile and hydrolyzed, preferably alkali hydrolyzed, polyacrylamides. Copolymers of acrylamide and acrylic acid are also highly effective. The sodium salts of hydrolyzed polyacrylonitriles may be prepared in the conventional manner, i.e., by subjecting a polyacrylonitrile to hydrolysis with sodium hydroxide, for example. The hydrolysis usually goes to about 75% completion, or in other words, about three out of every four nitrile groups are hydrolyzed to carboxylic acid groups. The hydrolyzed polyacrylamides may be prepared by subjecting a polyacrylamide to hydrolysis either under alkali or acid conditions. That is to say, sodium hydroxide, for example, may be used, or a strong acid may be used. In either event, the hydrolysis is about 50–60% effective so that the final products consist of a hydrolyzed polymer having varying ratios of amide and carboxylic acid groups. Copolymers of acrylamide and acrylic acid are prepared by copolymerizing these two materials.

When these especially preferred polymers are to be used in the practice of the present invention, it has been found that the polymers should contain at least about 10% carboxy groups.

The polymers obtained by hydrolyzing polymeric material containing polyacrylonitrile are cheap and give excellent results. Here again, the polymer may be a homopolymer or the acrylonitrile may be copolymerized with small amounts of other materials, such as vinyl pyridine, vinyl acetate, stryene, vinyl ethers, vinyl halides, acrylic esters and the like.

It is an advantage of the present invention that the hydrolyzed polyacrylonitriles may be of very low grade. It is thus possible to use polyacrylonitriles which have insufficient purity for other uses, such as fibers. The possibility of using these normally discarded, off-grade products makes a source of very cheap material available for use in the present invention. Where the amount of by-product, off-grade material is not sufficient to supply the demand and the polymers must be made directly, it is usually found that the homopolymer of acrylonitrile is somewhat cheaper to make than the copolymers.

For optimum beneficial effect, the molecular weight of the polymers is of some importance. The molecular weight may be from about 5,000 to the limits of water solubility. Polymers of over 1,000,000 usually dissolve with difficulty. The upper molecular weight limit does not appear to be at all critical and is set only by the practical difficulty of making extremely highly polymerized polymers which are soluble. The insoluble or nondispersible polymers are not included herein. However, so long as the polymer is water-soluble or water-dispersible it is operable in carrying out the present invention.

This invention will be described in greater detail in conjunction with the following specific examples in which parts are by weight unless otherwise specified.

*Example 1*

A cathode ray tube having a diameter of 20 inches and suitable for the screen of a colored television receiver is etched by a 10% aqueous solution of hydrofluoric acid containing 500 parts per million of hydrolyzed polyacrylonitrile having a molecular weight of approximately 400,000. After etching for sufficient time to insure proper tooth, the etching solution is poured out and the tube washed out with pure water. There is no appreciable deposit of barium silicofluoride on the face of the tube and the tube is easily washed with water so as to be suitable for the later treatment with fluorescent phosphors.

*Example 2*

By way of contrast a similar tube from the same lot is tested by using the same concentration of hydrofluoric acid for the same length of time as an etch. When the etching solution is poured out and the tube washed out with distilled water, washing for several hours is scarcely sufficient to remove the slimy deposit of barium silicofluoride which must be removed to ensure satisfactory adherence of the phosphors used in manufacturing cathode ray tubes.

Because of the difficulty of measuring the amount of inhibition of the barium silicofluoride in the production of cathode ray tubes the following examples show under controlled conditions the degree of inhibition resulting from the use of certain polyelectrolytes. The procedure is as follows:

*Example 3*

Sixty-eight parts of water are transferred to a styrene dish, and 0.10 part of sodium silicofluoride and 12 parts of 48.8% hydrofluoric acid are added. These are thoroughly mixed and dissolved. To this solution is added 20 parts of a 5.54% solution of barium chloride. The combined solutions are stirred with a platinum rod and almost immediately a heavy precipitate of barium silicofluoride appears. This is allowed to settle for an hour after which it is filtered on a tared platinum Gooch crucible. After drying, the crucible is weighed and the weight of the barium silicofluoride determined by difference. Just prior to the addition of the barium chloride, various amounts of polyelectrolytes are added. The results are shown in the accompanying table.

| Polyelectrolyte | Molecular Weight | Weight Added, Mgs. | Wt. of BaSiF$_6$ Ppted., Mgs. |
|---|---|---|---|
| Control | | | 625 |
| Polyacrylic Acid | 23,000 | 5 | 230 |
| Do | 23,000 | 10 | 141 |
| Do | 23,000 | 20 | 130 |
| Do | 23,000 | 50 | 75 |
| Do | 100,000 | 50 | 25 |
| Do | 750,000 | 50 | 35 |
| Hydrolyzed Polyacrylamide | 975,000 | 50 | 300 |
| Do | 250,000 | 50 | 300 |
| Hydrolyzed Polyacrylonitrile (Sodium Salt) | 400,000 | 50 | 100 |
| Do | 38,000 | 50 | 15 |

It is noted that all of the polyelectrolytes have a pronounced effect in preventing the precipitation of the barium silicofluoride. The molecular weights of the material used may vary from less than about 5,000 to the limits of water solubility. Polymers of over 1 million usually are more difficult to dissolve and accordingly lower molecular weights are conveniently used. The polymers may be dissolved in water and added as a concentrated solution of about ½% or such other concentration as is convenient for the particular polymer chosen rather than the polymers being added dry. The pre-solution of the polymer in water is a more convenient method of adding to the solution.

What is claimed is:

1. The method of inhibiting the precipitation of barium silicofluoride in the etching of barium glass with aqueous hydrofluoric acid which comprises: incorporating in the aqueous hydrofluoric acid etch solution in contact with the barium glass a small amount of a synthetic polymeric water-soluble polyelectrolyte having a structure derived by the substantially linear polymerization of at least one monoolefinic compound through the aliphatic unsaturated group.

2. The method of claim 1 in which the polymer is the sodium salt of a hydrolyzed polymer of acrylonitrile.

3. The method according to claim 1 in which the polymer is a hydrolyzed polyacrylamide.

4. The method of inhibiting the precipitation of barium silicofluoride in the etching of barium glass with aqueous hydrofluoric acid which comprises: incorporating in the aqueous hydrofluoric acid etch solution in contact with the barium glass from 50 to 500 parts per million of said solution by weight of a synthetic polymeric water-soluble polyelectrolyte having a structure derived by the substantially linear polymerization of at least one monoolefinic compound through the aliphatic unsaturated group, and which has a molecular weight of at least 5,000.

5. The method of claim 4 in which the polymer is the sodium salt of a hydrolyzed polymer of acrylonitrile.

6. The method of claim 4 in which the polymer is a hydrolyzed polyacrylamide.

7. The method of claim 4 in which the polymer is polyacrylic acid.

References Cited in the file of this patent

UNITED STATES PATENTS 2,652,360    Bond _____ Sept. 15, 1953

FOREIGN PATENTS 166,783    Australia _____ Sept. 10, 1953